(12) United States Patent
Mu et al.

(10) Patent No.: US 11,928,005 B2
(45) Date of Patent: *Mar. 12, 2024

(54) TECHNIQUES FOR PERFORMING RESYNCHRONIZATION ON A CLUSTERED SYSTEM

(71) Applicant: NetApp Inc., San Jose, CA (US)

(72) Inventors: Paul Yuedong Mu, Sunnyvale, CA (US); Paul Ngan, Sunnyvale, CA (US); Manoj Sundararajan, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,339

(22) Filed: Sep. 19, 2022

(65) Prior Publication Data

US 2023/0016882 A1 Jan. 19, 2023

Related U.S. Application Data

(63) Continuation of application No. 16/459,982, filed on Jul. 2, 2019, now Pat. No. 11,449,373, which is a continuation of application No. 15/661,070, filed on Jul. 27, 2017, now Pat. No. 10,379,919, which is a continuation of application No. 14/518,422, filed on Oct. 20, 2014, now Pat. No. 9,720,752.

(51) Int. Cl.
*G06F 16/00* (2019.01)
*G06F 11/00* (2006.01)
*G06F 11/20* (2006.01)

(52) U.S. Cl.
CPC ............ *G06F 11/006* (2013.01); *G06F 11/00* (2013.01); *G06F 11/2097* (2013.01); *G06F 11/2038* (2013.01); *G06F 11/2048* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 6,289,357 B1 * | 9/2001 | Parker | G06F 11/2082 707/610 |
| 6,823,349 B1 * | 11/2004 | Taylor | G06F 11/2082 |
| 7,039,661 B1 * | 5/2006 | Ranade | G06F 16/184 707/648 |
| 7,383,264 B2 | 6/2008 | Sutoh et al. | |
| 7,409,587 B2 | 8/2008 | Perry | |
| 7,702,906 B1 * | 4/2010 | Karr | H04L 67/10 713/164 |

(Continued)

*Primary Examiner* — Debbie M Le
(74) *Attorney, Agent, or Firm* — Cooper Legal Group, LLC

(57) ABSTRACT

Various embodiments are generally directed an apparatus and method for receiving information to write on a clustered system comprising at least a first cluster and a second cluster, determining that a failure event has occurred on the clustered system creating unsynchronized information, the unsynchronized information comprising at least one of inflight information and dirty region information, and performing a resynchronization operation to synchronize the unsynchronized information on the first cluster and the second cluster based on log information in at least one of an inflight tracker log for the inflight information and a dirty region log for the dirty region information.

29 Claims, 14 Drawing Sheets

(56) References Cited

U.S. PATENT DOCUMENTS

| | | |
|---|---|---|
| 7,925,633 B2 | 4/2011 | Suzuki et al. |
| 8,286,175 B2 * | 10/2012 | Li .................. G06F 9/4812 |
| | | 709/224 |
| 8,396,830 B2 | 3/2013 | Sutoh et al. |
| 8,825,603 B2 * | 9/2014 | Harris, Jr. ............ G06F 3/0689 |
| | | 707/634 |
| 9,058,371 B2 | 6/2015 | Thomsen et al. |
| 9,268,811 B1 * | 2/2016 | Thakur ............... G06F 16/2358 |
| 9,317,576 B2 | 4/2016 | Merriman et al. |
| 9,720,752 B2 | 8/2017 | Mu et al. |
| 10,379,919 B2 | 8/2019 | Mu et al. |
| 11,449,373 B2 | 9/2022 | Mu et al. |
| 2012/0166390 A1 | 6/2012 | Merriman et al. |
| 2013/0110782 A1 | 5/2013 | Mcbrearty |

\* cited by examiner

600

RECEIVE INFORMATION TO WRITE ON A CLUSTERED SYSTEM COMPRISING AT LEAST A FIRST CLUSTER AND A SECOND CLUSTER
*605*

DETERMINE THAT A FAILURE EVENT HAS OCCURRED ON THE CLUSTERED SYSTEM CREATING UNSYNCHRONIZED INFORMATION, THE UNSYNCHRONIZED INFORMATION COMPRISING AT LEAST ONE OF INFLIGHT INFORMATION AND DIRTY REGION INFORMATION RECEIVED BY THE CLUSTERED SYSTEM DURING THE FAILURE EVENT
*610*

PERFORM A RESYNCHRONIZATION OPERATION TO SYNCHRONIZE THE UNSYNCHRONIZED INFORMATION ON THE FIRST CLUSTER AND THE SECOND CLUSTER BASED ON LOG INFORMATION IN AT LEAST ONE OF AN INFLIGHT TRACKER LOG AND A DIRTY REGION LOG
*615*

TECHNIQUES FOR PERFORMING RESYNCHRONIZATION ON A CLUSTERED SYSTEM

RELATED APPLICATIONS

This application claims priority to and is a continuation of U.S. application Ser. No. 16/459,982, filed Jul. 2, 2019, now allowed, titled "TECHNIQUES FOR PERFORMING RESYNCHRONIZATION ON A CLUSTERED SYSTEM," which claims priority to and is a continuation of U.S. Pat. No. 10,379,919, filed Jul. 27, 2017, titled "TECHNIQUES FOR PERFORMING RESYNCHRONIZATION ON A CLUSTERED SYSTEM," which claims priority to and is a continuation of U.S. Pat. No. 9,720,752, filed on Oct. 20, 2014, titled "TECHNIQUES FOR PERFORMING RESYNCHRONIZATION ON A CLUSTERED SYSTEM," which are incorporated herein by reference.

TECHNICAL FIELD

Embodiments described herein generally relate to resynchronizing storage clusters on a clustered system.

BACKGROUND

Clustered storage systems may store and provide information to one or more computing systems in a network, such as a storage area network (SAN). More specifically, a computing system may write information to a storage system and read information from the storage system over one or more network connections. These clustered storage systems may include storage devices, such as disks, in an array to store the information.

The information stored on the clustered storage systems may be critical and important to clients utilizing the clustered storage system. Thus, the clustered storage systems may provide backup services to the clients. More specifically, a backup or a copy of the information may be stored on the clustered storage system and, in some instances, on storage devices that are separate from where the original information is stored. However, in some instances, errors or failures may cause information stored on the clustered storage system to become unsynchronized.

BRIEF DESCRIPTION OF THE DRAWINGS

Embodiments described herein are illustrated by way of example, and not by way of limitation, in the figures of the accompanying drawings in which like reference numerals refer to similar elements.

FIG. 6 illustrates an exemplary embodiment of a logic flow.

DETAILED DESCRIPTION

Figure 1A:
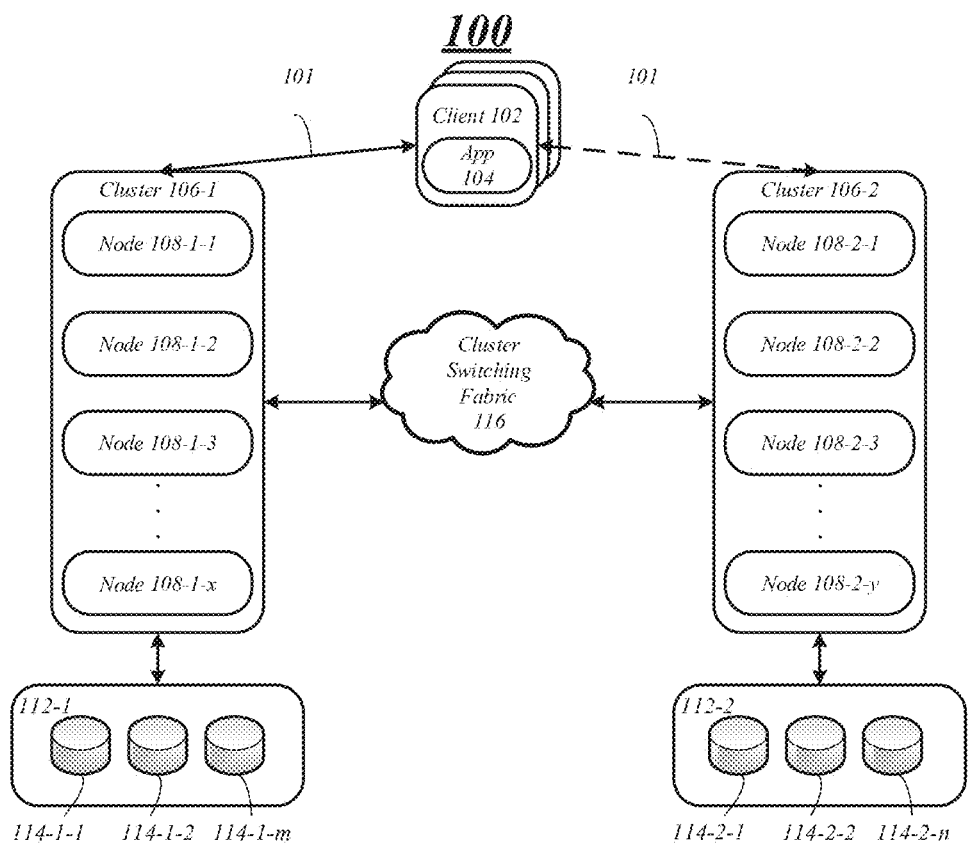
FIG. 1A illustrates an exemplary embodiment of a storage computing system.

Various embodiments are directed systems, devices, apparatuses, methods and so forth to perform resynchronization operations on a clustered system. For example, a clustered system may include a primary cluster and a secondary cluster, where data is synchronized on both clusters to provide failover and backup capabilities. Generally, information may be received from one or more client devices by the primary cluster and copied to the secondary cluster in a parallel manner. When the system is operating "normally", the information may be copied in a parallel manner by writing to storage devices associated with the primary cluster and storage devices associated with the secondary cluster in parallel.

However, at various points in time, for any number of reasons, the primary cluster and secondary cluster may fall out of sync or become unsynchronized. In other words, information stored on the storage device associated with the primary cluster may not match or mirror the information stored on storage device associated with a secondary. For example, a failure event, such as a communication failure, a hardware failure, a software failure, and so forth may occur on either of the clusters which may cause information to not be written to one or more of the storage devices. Thus, various embodiments are directed to performing resynchronization operations so that the primary cluster and secondary cluster are synchronized after the failure event or whatever has caused the clustered system to become unsynchronized is resolved.

In some embodiments, one or more synchronization logs may be used to track information for storage on the clustered system and are used to perform the resynchronization operation when information becomes out-of-sync. For example, the clustered system may include an inflight tracker log which may store information to track inflight information including data and other information that is in the process of being written to the storage devices associated with both the primary and secondary clusters, but not committed on both the primary and secondary clusters. Only after a confirmation that the inflight information has been committed to storage devices associated with the primary cluster and the secondary cluster will the inflight tracker log for that information be cleared.

When the clustered system becomes out of the sync one or more components of the clustered system may read the inflight tracker log, determine information that has not been fully committed or written to on the clustered system, and perform a resynchronous operation to retrieve the information and fully commit it on the clustered system. For example, the clustered system may determine regions of a data structure on storage devices associated with primary cluster at least allocated to have inflight information based on the inflight tracker log and copy the inflight information to a corresponding region of a data structure on storage devices associated with the secondary cluster.

In some instances, since the inflight information may not have been committed on either the primary cluster or the secondary cluster the information copied from the primary cluster to the secondary cluster may be "old" information or data. However, in some instances the inflight information may have been committed on the primary cluster, but not on the secondary cluster and thus "new" information may be copied from the primary cluster to the secondary cluster during the resynchronization operation. However, in some other instances, inflight information may have been committed on the secondary cluster, but not on the primary cluster and "old" information may be copied from the primary cluster to the secondary cluster during the resynchronization operation. Copying "old" information from the primary cluster to the secondary cluster may be desirable since the primary cluster is the source of information to the client devices. However, various embodiments are not limited in this manner. For example, when the secondary cluster has committed the inflight information, it may be copied from secondary cluster to the primary cluster.

Various embodiments may also include a dirty region log to track dirty region information or data and information that has been written to one of the clusters, either the primary cluster or the secondary cluster, but not both. The clustered system may also use this dirty region log to perform resynchronization operations to ensure that the dirty region information is synchronized across the clustered system, on both the primary cluster and the secondary cluster. For example, various components of the clustered may read the dirty region log and determine the dirty region information that is not synchronized on the clustered. Further, the information may be copied from storage devices associated with the cluster having the information to storage devices associated with the cluster not having the information. These and other details will become more apparent with the following description.

Various embodiments also relate to apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of an exemplary clustered system 100 including a first cluster 106-1 having one or more nodes 108-1-x configured to provide processing and storage services on a plurality of storage devices 114-1-m of a storage array 112-1, where x and m may be any positive integer. The clustered system 100 may also include a second cluster 106-2 having a plurality of nodes 108-2-y also coupled with a plurality of storage devices 114-2-n of a storage array 112-2, where y and n may be any positive integer. In the exemplary embodiment, FIG. 1A illustrates a client 102 coupled with clusters 106-1 and 106-2 through one or more network connections 101. In some embodiments, the one or more network connections 101 may include any type of wired or wireless connection or combination thereof. The client 102 may communicate any type of information to the clusters 106 for storage on one or more storage devices 114 in a storage array 112 over the one or more network connections 101. Although FIG. 1 illustrates only one client device, any number of client devices may communicate with the clustered system 100.

The clustered system 106 may be configured to provide failover and backup capabilities for the client 102. In some embodiments, the first cluster 106-1 may be considered a primary cluster and the second cluster 106-2 may be considered a secondary cluster. The client 102 may communicate information with first cluster 106-1 as a primary cluster and the information may be communicated between the first cluster 106-1 and the second clustered system 106-2 via the cluster switching fabric 116 to provide the failover and backup capabilities.

In an exemplary embodiment, if an error or a failover event occurs on the clustered system 100, the client 102 may switch from communicating with the first cluster 106-1 to communicate with the second cluster 106-2. Since the information is copied or backed up on the second cluster 106-2, the switching between the clusters 106 occurs transparently and seamlessly to the client 106. In addition, various embodiments are not limited to switching from the first cluster 106-1 to the second cluster 106-2 and switching may occur in either direction. In some embodiments, the client 102 may switch back and communicate information with the first cluster 106-1 once the error or failure event has been resolved. In the same or other embodiments, the second cluster 106-2 may be operating as the primary cluster and the client 102 may switch and communicate with the first cluster 106-1 during a failure event.

Client 102 may communicate any type of information to be stored on the clustered system and may be any type of computing device having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Client 102 may be configured to interact with nodes 108 of the clusters 106 in accordance with a client/server model of information delivery. That is, a client 102 may request the services of a node 108, and the node 108 may return the results of the services requested by the client 102 over a network including one or more network connections 101. Client 102 may be configured to execute processor executable instructions, shown as application(s) 104 for reading and writing information at the cluster 106-1 and cluster 106-2. Such application(s) 104 may include a database application, a financial management system, an electronic mail application or any other application type.

The client 102 may communicate over any type of one or more network connections 101 including an Ethernet network, a Fibre Channel (FC) network or any other network type. Moreover, the nodes 108 may be interconnected by a cluster switching fabric 116 which may be embodied as a Gigabit Ethernet switch or any other interconnect type.

Further, the client 102 may issue packets using application(s) 104 including file-based access protocols, such as the Common Internet File System ("CIFS") protocol or the Network File System ("NFS") protocol, over the Transmission Control Protocol/Internet Protocol ("TCP/IP") when accessing information in the form of certain data containers. Alternatively, the client 102 may issue packets using application(s) 104 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

In various embodiments a node 108 may be any type of computing device and may include any number of functional components that cooperate to provide distributed storage system architecture for the client 106. Each node 108 is generally organized as a network element and a storage device element. The network element may include functionality that enables nodes 108 to connect to the client 102 over one or more network connections 101, while each storage device element connects to one or more storage devices 114 or a storage array 112 having a plurality of storage devices 114. Further and as will be discussed in more detail below nodes 108 may include other functional components for providing the backup and failover capabilities and to ensure synchronization of information on the clustered system.

Each of the clusters 106-1 and 106-2 including the nodes 108 may be coupled with or include a storage array 112-1 and 112-2 having or more storage devices 114. The storage arrays 112-1 and 112-2 may include a number of elements and components to provide storage services to the client 102. More specifically, the storage arrays 112 may implement a high-level module, such as a file system, to logically organize the information as a hierarchical structure of directories or files and may have a data structure such as logical units identified by a logic unit number (LUN) on the storages devices 114.

In various embodiments, the LUN may be a unique identifier used to designate individual or collections of hard disk devices for address by a protocol associated with a SCSI, iSCSI, Fibre Channel (FC), and so forth. Logical units are central to the management of block storage arrays shared over a storage area network (SAN). Each LUN identifies a specific logical unit, which may be a part of a hard disk drive, an entire hard disk or several hard disks in a storage device 114, for example. As such, a LUN could reference an entire RAID set, a single disk or partition, or multiple hard disks or partitions. The logical unit is treated as if it is a single device and is identified by the LUN.

Each logical unit may be divided into a number of smaller regions which may be further divided into blocks. Each region of a data structure may have a particular region size, such as 1 Megabyte (MB) and each block may have a block size, such as 4 Kilobytes (KB), 8 KB, 16 KB, 32 KB, 64 KB, and so forth. Information received from a client 102 may be stored and written to the logical units on a block-by-block basis or in chunks of blocks. Further and as will be discussed in more detail, information targeted to be written to a logical unit may be tracked and logged in one or more logs on a region-by-region basis. This tracking and logging of information may be used to ensure that the primary cluster and secondary cluster are in sync and to enable the resynchronization of information across the clustered system when it falls out of sync, such as when a failure event occurs.

Figure 1B:
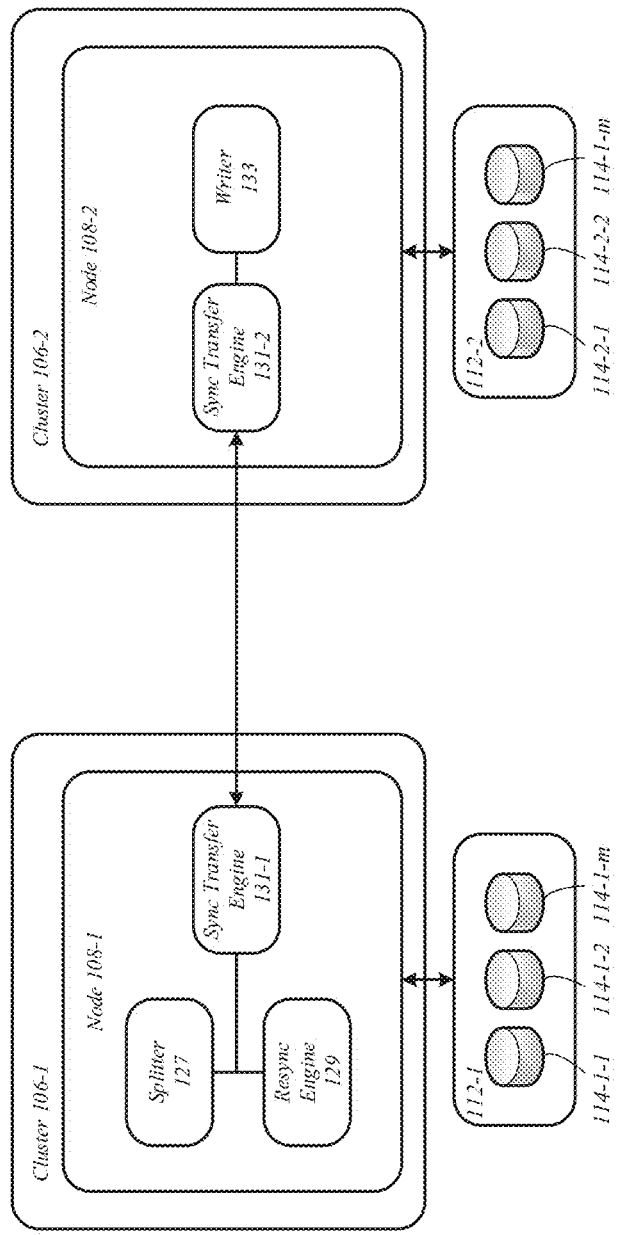
FIG. 1B illustrates a second exemplary embodiment of a storage computing system.

FIG. 1B illustrates an exemplary embodiment of a system 125 for providing syncing and resyncing capabilities in a clustered system environment. System 125 may include cluster 106-1 having node 108-1 and cluster 106-2 having node 108-2 and may be the similar to or the same as the liked named elements discussed above with respect to FIG. 1A. FIG. 1B only shows each cluster having one node for illustrative purposes only and as discussed above with respect to FIG. 1A, a cluster may have any number of nodes. Further and in some embodiments, cluster 106-1 may be a primary cluster and cluster 106-2 may be a secondary cluster. However, cluster 106-1 and cluster 106-2 are not limited in this manner and at certain times, such as when a failure event occurs, cluster 106-2 may be the primary cluster and cluster 106-1 may be the secondary cluster.

In some embodiments, a client may communicate with the primary cluster and send it information to store on storage devices associated with the primary cluster. The information may be sent to the secondary cluster to store as a backup and to provide failover capabilities in case of a failure. More specifically, a client may send information to cluster 106-1 when it is operating as a primary cluster and the information may be copied to cluster 106-2. In another example, a client may send information to cluster 106-2 when it is operating as a primary cluster and the information may be copied to cluster 106-1. Various embodiments are not limited in this manner.

FIG. 1B illustrates one exemplary configuration where node 108-1 includes components for receiving information from a client and processing the information as part of cluster 106-1 operating as a primary cluster. When node 108-1 is operating in a primary cluster, it may include a splitter 127, a resync engine 129 and a sync transfer engine 131-1. Node 108-2 is illustrated as having components for processing information as part of cluster 106-2 operating as a secondary cluster and includes a sync transfer engine 131-2 and a writer 133. Any node operating in a primary cluster may include components illustrated in node 108-1 and any node operating in a secondary cluster may include components illustrated in node 108-2. When the clusters 106-1 and 106-2 switch operating roles, the components illustrated operating on the cluster 106-1 may operate on cluster 106-2, and vice versa. However, for simplification purposes FIG. 1B is discussed with cluster 106-1 as the primary cluster and cluster 106-2 as the secondary cluster.

In various embodiments, a splitter 127 on a primary cluster may be responsible for receiving information from one or more clients, such as client 102 and providing synchronous write capabilities. The information received from the client 102 may be received as one or more write requests to write information on storage devices, such as storage devices 114-1 and 114-2. The splitter 127 may send the information to storage devices associated with both the primary cluster and the secondary cluster in parallel or in a synchronous manner. For example, the splitter 127 may send the original information to the storage devices 114-1 associated with the primary cluster and may send a copy of the information to storage devices 114-2 associated with the secondary cluster at the same time or nearly the same time. Various embodiments are not limited in this manner and the splitter 127 may first send the information to the storage devices 114-1 associated with the primary cluster and then to the storage devices 114-2 associated with the secondary cluster in a serial manner. However, by sending the information in parallel or at nearly the same time, latency times may be reduced when performing read and write requests.

In various embodiments, the splitter 127 may utilize the sync transfer engine 131-1 to send information, such as the copy of the information, to the secondary cluster. The sync transfer engine 131-2 operating on the secondary cluster may receive the copy of the information from the sync transfer engine 131-1 and may send it to a writer 133 for writing and committing the information to storage devices 114-2 in storage array 112-2.

The splitter 127 may also communicate with a resync engine 129 and provide it with log information, such as inflight log information and dirty region log information to store in one or more logs. The inflight log information may track inflight information or data and information received by a clustered system but not yet written on one or more storage devices associated with a primary cluster and/or a secondary cluster on a region-by-region basis. The inflight log information may track the inflight information and indicate that the inflight information has not been successfully stored on storage devices associated with the primary cluster, storage devices associated with the secondary cluster, or both.

In various embodiments, the storage devices associated with each of the clusters, primary and secondary, may send a response back to the splitter 127 indicating that the inflight information has been successfully stored. Only when storage devices associated with both clusters have sent a response back to the splitter 127 indicating success, will the inflight log information be updated to reflect that the information has been stored.

The splitter 127 may first send the inflight tracker log information to the resync engine 129 prior to sending the inflight information to the storage devices of the primary cluster and a copy of the inflight information to the sync transfer engine 133-1 for storage on the secondary cluster. This may be done to ensure that the inflight information is tracked by a log if a failure event were to occur during the communication of the inflight information. As will be discussed in more detail below with respect to FIG. 1D, the inflight tracker log information may be stored in an inflight tracker log 177.

The splitter 127 may also send dirty region log information to the resync engine 129 to track and log information stored on one the clusters, either the primary cluster or the secondary cluster, but not both during a failure event. In other words, the dirty region log information indicates information has been successfully written to at least one storage device associated with one of the clusters and a response has been received by the splitter 127. In various embodiments, the dirty region log information may be sent to the resync engine 129 during a failure event to track regions written to during the failure event.

In one example, information may be stored on storage devices associated with a primary cluster, but not on storage devices associated with a secondary cluster during a failure event and each region written to on the primary cluster may be tracked by the dirty region tracker log 179. In another example, information may be stored in a data structure on the storage devices associated with the secondary cluster, but not the primary cluster during the failure event and each region written to on the secondary cluster may be tracked by the dirty region log 179. In a third example, some information may be stored in a data structure associated with the primary cluster and some other information may be stored in a data structure associated with the secondary cluster during a failure event and the each region written on both the primary cluster and secondary cluster may be tracked in the dirty region log 179.

In various embodiments, a clustered system may include a resync engine 129 to ensure that the clusters are in sync. More specifically, the resync engine 129 may utilize a resynchronous operation to ensure that inflight information is stored on the clustered system and data structures for each cluster are in sync. More specifically, the resync engine 129 may perform the resynchronous operation after a failure event has been resolved by copying information from one cluster to another cluster based on the inflight tracker log information and dirty region log information. Thus, each of the logs, the inflight tracker log and the dirty region log, may provide information to the resync engine 129 to ensure that a clustered system is synchronized after a failure event or any other event that may cause the clusters to become unsynchronized.

With respect to the inflight information, the resync engine 129 may perform a resynchronous operation and use the inflight tracker log information in the inflight tracker log 177 to determine inflight information that may not have been written to storage devices due to the failure event or loss of data. In some instances, since the inflight information may not have been committed on either the primary cluster or the secondary cluster the information copied by the resync engine 129 from the primary cluster to the secondary cluster may be "old" information or data. However, in some instances the inflight information may have been committed on the primary cluster, but not on the secondary cluster and thus "new" information may be copied by the resync engine 129 from the primary cluster to the secondary cluster during the resynchronization operation. However, in some other instances, inflight information may have been committed on the secondary cluster, but not on the primary cluster and "old" information may be copied by the resync engine 129 from the primary cluster to the secondary cluster during the resynchronization operation. Copying "old" information from the primary cluster to the secondary cluster may be desirable since the primary cluster is the source of information to the client devices. However, various embodiments are not limited in this manner. For example, when the secondary cluster has committed the inflight information, the resync engine 129 may copy information from secondary cluster to the primary cluster. The resync engine 129 may repeat this operation for all of the inflight information indicated in the inflight tracker log 177 on a region-by-region basis.

The resync engine 129 may also ensure the storage devices of the primary cluster and secondary cluster are in sync based on the dirty region log information in the dirty region log 179. As previously discussed, the dirty region log 179 may have dirty region log information indicating one or more regions that may have been written to while the clustered system was in a failed state. Since these regions were written to while the system was the failed state, the information may not be synced across the primary and secondary clusters. To resync the information, the resync engine 129 may perform the resynchronous operation using a sweeping hand method to copy information from one cluster having the information to another cluster.

The sweeping hand method may include reading information and writing information from the data structures or logical units in a block-by-block manner, or by chunks of blocks. The sweeping hand method may be performed on each region indicated in the dirty region log 179 as having dirty region information. As will be discussed in more detail below, the resync engine 129 may start the resynchronous operation at one end point of a region and finish at another end point of the region. In some embodiments, the starting end point may be a block having the lowest block number and the finishing end point may be a block having the highest block number. However various embodiments are not limited in this manner and starting end point may be the block having the highest block number and the finishing end point may be the block having the lowest block number.

During the resynchronous operation, the resync engine 129 may read information from a portion of a region, such as a block or chunk of blocks on a storage device and write the information to a corresponding portion of a region on a different storage device. In some embodiments, the information may be read from a storage device associated with a primary cluster and written to a storage device associated with a secondary cluster, or vice versa. To prevent corruption of the information being resynced, the resync engine 129 may enable a lock on the portion of the region being read from and written to. By enabling a lock on the portion, the resync engine 129 may prevent the corruption of information while it is being sync'd across the clusters.

Further, the clustered system may receive new information from a client for storage while the resynchronous operation is being conducted. The resync engine 129 may handle the writing of the new information to the storage devices of both the primary cluster and the secondary cluster during the resynchronous operation. More specifically, the resync engine 129 may receive the new information from the splitter 127 and may determine whether the new information is to be stored in a portion of a region that already has been resynced, in a portion of the region that is currently being resynced or in a portion of the region that will be resynced at a future point in time.

The resync engine 129 may enable the new information to be written to storage devices associated with both the primary cluster and the secondary cluster when the new information is to be stored in a portion of the region already resynced. When the new information is be stored in the portion of the region currently being resynced, the resync engine 129 may wait until the resynchronous operation of this portion is complete and then enable the new information to be written to storage devices associated with both the primary cluster and the secondary cluster. As previously discussed, the resync engine 129 may enable a lock on the portion of the region currently being resynced to prohibit reading and writing to this portion. The lock may be lifted or disabled once resyncing has completed. Finally, the resync engine 129 may enable writing new information to a portion of a region that will be resynced at some future point in time. In this case, the new information only needs to be written to the portion to be resynced because it will be copied to the other cluster during the resynchronous operation.

Figure 1C:
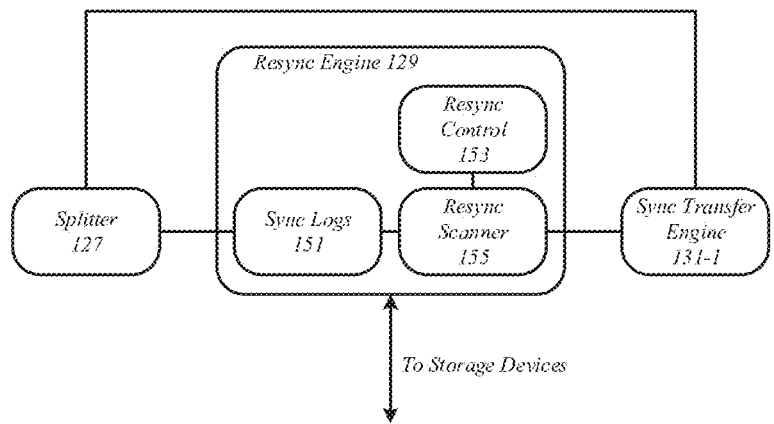
FIG. 1C illustrates a third exemplary embodiment of storage computing system.
Figure 1D:
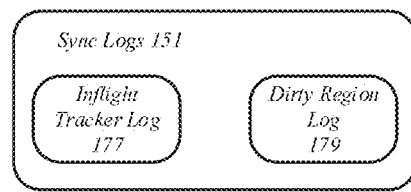
FIG. 1D illustrates a fourth exemplary embodiment of a storage computing system.

FIG. 1C illustrates an exemplary detailed embodiment of a resync engine 129 having components to perform the operations described above including resynchronous operations, processing new information, and ensuring clustered systems are in sync. In various embodiments, the resync engine 129 may include sync logs 151, such as the inflight tracker log 177 and the dirty region log 179 as illustrated in FIG. 1D. The resync engine 129 may also include a resync control 153 and a resync scanner 155. Various embodiments are not limited in this manner and the resync engine 129 may include more or less components to provide various resync functionality.

The resync control 153 may control various aspects of a resynchronous operation including initialization, resyncing information from a data structure on a primary cluster to a data structure on a secondary structure or vice versa, synchronizing lost inflight information, logging dirty region information, handling new information during a resynchronous operation, and so forth. For example, the resync control 153 may initialize or start a resynchronous operation based on input from a user or information received from other system components. More specifically, a user may manually start a resynchronous operation via one or more inputs using an input device, such as a keyboard, mouse, touchscreen interface, and so forth. In some embodiments, one or more components (not shown) may monitor and determine when a failure event has occurred and send information to the resync control 153 to start a resynchronous operation once the failure event has been resolved.

Further, the resync control 153 may also control the resynchronous operation by reading the sync logs 151 and determining information, such as inflight information and dirty region information that needs to be resynchronized across a clustered system. Once the resync control 153 determines the information to resynchronize, it may perform various operations including synchronizing the information across the clustered system including the primary cluster and the secondary cluster. In particular, the resync control 153 may send the inflight information directly to the storage devices associated with the primary cluster and may send a copy of the information to the secondary cluster via sync transfer engines operating on both sides of the clustered system. The information and the copy of the information may be written into one or more portions of one or more regions of a data structure based on write requests included with the inflight information.

In some embodiments, the resync control 153 may handle copying information between the primary cluster and secondary cluster based on inflight log information in the inflight log 177 and/or the dirty region log information stored in the dirty region log 179. As previously discussed, the inflight log 177 and dirty region log 179 may store or indicate regions of data structures stored on the primary cluster, the secondary cluster, or both. The resync control 153 may perform forward resynchronization operations and utilize the resync scanner 155 to copy information from a data structure associated with the primary cluster to a corresponding data structure associated with the secondary cluster. Furthermore, the resync control 153 may perform reverse resynchronization operations using the resync scanner 155 and copy information from a data structure associated with the secondary cluster to a corresponding data structure associated with the primary cluster.

In various embodiments, the resync control 153 may perform the resynchronization operations utilizing a sweeping hand method. For example, the resync control 153 may copy information from one end point of a region to another end point of the region. In some embodiments, the resync control 153 may start the resynchronous operation at an end point having the lowest block number and copying the information on a block-by-block basis or in groups of blocks using the resync scanner 155 until an end point having a highest block number is reached, or vice versa. The resync control 153 may determine the region to copy information from based on the dirty region log information in the dirty region log 179.

In some embodiments, the resync control 153 may also control the synchronization of new information received from one or more clients while the resynchronous operation is executing. For example, the resync control 153 may enable writing information to a region or a portion of a region that already has been resynced on both the primary cluster and secondary cluster. In another example, the resync control 153 may wait for the resynchronous operation to complete on a portion of a region when the new information is to being written to that portion of the region currently being resynced. In a third example, when the new information is to be located in a portion of a region that needs to be resynced, the resync control 153 may write the new information to a data structure on only one cluster of the clustered system, either on the primary cluster or the secondary cluster wherever information is being read from.

FIG. 1D illustrates an exemplary embodiment of sync logs 151 including an inflight tracker log 177 and a dirty region log 179 to store log information. The inflight tracker log 177 may store inflight tracker log information and the dirty region log 179 may store dirty region log information. The inflight tracker log information may record any incoming writes from one or more clients that have not been fully committed or written on a clustered system. Moreover, the inflight tracker log information may log the incoming writes when the write is first received by the clustered system. This is to ensure that if a relationship falls out of sync between clusters, such as a primary cluster and secondary cluster, the regions corresponding to the writes can be brought back into sync, i.e. resynced. Once information relating to the write instruction for information has been stored on both sides it is no longer considered inflight information and that region can be cleared in the inflight tracker log 179.

The inflight tracker log 177 may be a file stored in cache in random access memory, or on a persistent storage device such as a hard drive and may indicate each region having inflight information to be written in. In some embodiments, the file may be in a bitmap file format where each bit corresponds to a region of a data structure such as a logical unit. When a bit corresponding to a region is set to one, inflight information is to be saved in that corresponding region. When a bit corresponding to a region is set to zero, the corresponding region is clear and does not having any inflight information to be written to it. This coarse grain approach, i.e. each bit corresponding to a region, allows the file or inflight tracker log 177 to be small and stored in cache.

Similarly, the dirty region log 179 may store dirty region log information indicating information that may be written to regions during a failure event on one of the clusters. The splitter 127 may send dirty region log information to the dirty region log 179 when the clustered system is in a failed state or during a failure event. The dirty region log 179 may also implement and track dirty region information in a bitmap file on a region-by-region basis. Each bit corresponds to a region of a data structure such as a logical unit. When a bit corresponding to a region is set to one, dirty region information is saved in that corresponding region on either the primary cluster or the secondary cluster, but not both. When a bit corresponding to a region is set to zero, the corresponding region is in sync on both the primary cluster and secondary cluster.

Figure 2:
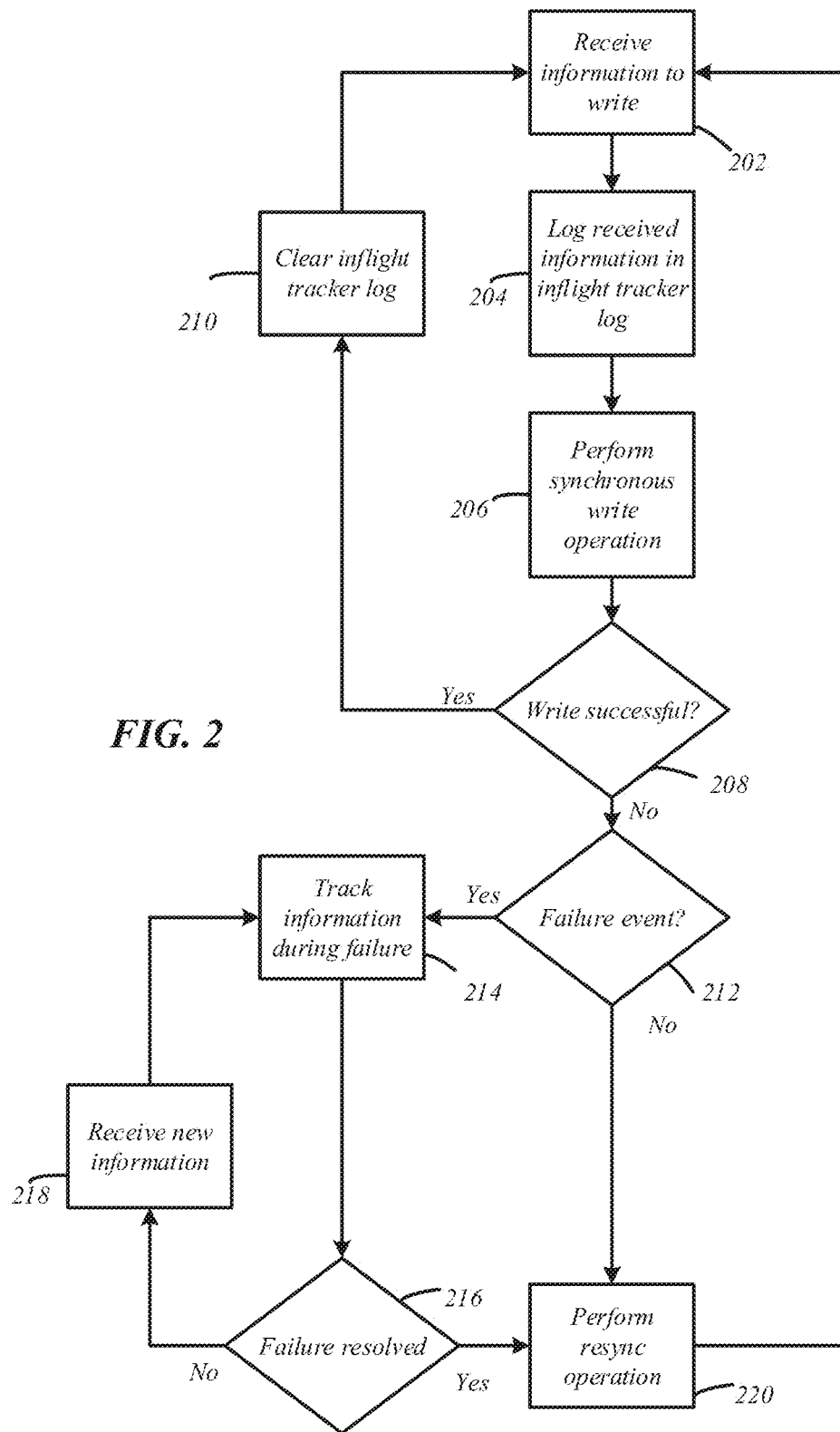
FIG. 2 illustrates a logic flow to communicate replication transfer.

FIG. 2 illustrates one exemplary embodiment of a logic flow 200 for processing information on a clustered system and tracking inflight information and dirty region information. Logic flow 200 may be representative of some or all of the operations executed by one or more embodiments described herein. Logic flow 200 is discussed with reference to the clustered system of FIGS. 1A-1D for illustrative purposes. However, various embodiments are not limited in the manner and the logic flow may be implemented on any computing system or device.

At block 202 a clustered system may receive information including one or more write instructions to store. For example, a primary cluster, such as cluster 106-1 may receive write instructions from a client 102 to store information and data on cluster array 112-1. Cluster 106-1 may receive the information and send it to one or more components including a splitter 127. The splitter 127 may prepare the information to be synchronously written across the clustered system on both the primary cluster and the secondary cluster. In particular, the splitter 127 may send inflight tracker log information to a resync engine 129 to store in an inflight tracker log 177. The inflight tracker log information may indicate one or more regions in which the information is to written to on the clusters and the resync engine 129 may store the inflight tracker log information in the inflight tracker log 177 at block 204.

In various embodiments, the splitter 127 may perform a synchronous write operation to write the information on both the primary cluster and secondary cluster at block 206. More specifically, the splitter 127 may send the information to be written on the storage devices associated with the primary cluster and send a copy of the information to be written on storage devices associated with the secondary cluster. In some embodiments, the splitter 127 may utilize a sync transfer engines 131 to communicate the copy of the information to secondary cluster and a writer 133 may write the copy of the information to the secondary cluster's storage devices. At block 208, the splitter 127 may determine whether the information has been successfully written to the primary cluster and secondary cluster. In some embodiments, the splitter 127 may receive information from the storage devices on each of the clusters indicate that the write operation successfully completed. If so, the splitter 127 may clear the inflight tracker log information from the inflight tracker log 177 for that information at block 210. The clustered system may continue to receive information and perform write operations.

If the write operation was not successful at block 208, a determination may be made as to whether a failure event has occurred at decision block 212. A failure event may include a network failure, a hardware failure, a software failure, etc. and may occur between clusters, nodes on the clusters, the client and the clustered system, and so forth. If a failure event has not occurred at block 212, a resynchronous operation may be performed on the clustered system at block 220 by a resync engine 129, for example. In this case, only the inflight information not successfully written to the clusters may be resynced. The resync engine 129 may perform a resynchronous operation for the inflight information by reading the inflight tracker log 177 to determine which regions need to be resynced, and copying the data and information on the primary cluster to the secondary cluster once the inflight information is received. In some instances, the data and information copied may be "old" data and information previously received on the clustered system. In other instances, the data and information may be "new" data and information received when the clustered system made an entry in the inflight tracker log. The clustered system may continue to receive information to write after the resynchronous operation has been performed.

If a failure event is determined to have occurred at block decision block 212, the clustered system may continue to receive information that may be successfully written to one of the clusters, either the primary cluster or secondary cluster, but not both. At block 214, the splitter 127 may send dirty region log information to a dirty region log 179 for the dirty region information or information that has been successfully written on one of the clusters but not both. Moreover, the dirty region log information may indicate which of the regions of a data structure that have been written to on one of the clusters. At decision block 216, a determination may be made as to whether the failure event has been resolved or not. For example, one or more components may send information to the splitter 127 indicating that the failure event has been resolved. In some embodiments, the splitter 127 may poll one or more components to determine if the failure event has been resolved. If the failure event has not been resolved and the splitter 127 continues to receive new information 218, the splitter 127 may track this new information in the dirty region log 179. The splitter 127 may track all of the information written to the clustered system in the dirty region log 179 during a failure event.

If the failure event is determined to be resolved at decision block 216, a resynchronous operation may be performed at block 220. In this case, the resync engine 129 may perform the resynchronous operation to resync the inflight information not successfully written on the clustered system and any dirty region information received during the failure event. The resync engine 129 may perform the resynchronous operation for the inflight information as previously discussed above copying information on the primary cluster and to the secondary cluster on a region-by-region basis. Further, the resync engine 129 may perform the resynchronous operation for the dirty region information by reading the dirty region log 179 to determine the regions that need to be resynced and copying the information from the regions having the information to corresponding regions on a cluster not having the information. In some embodiments, the resync engine 129 may utilize a sweeping hand method to copy information for regions and may perform the resynchronous operation for every region indicated in the dirty region log 179. Although logic flow 200 illustrates certain operations occurring in a certain order, various embodiments are not limited in this manner. Various operations may occur before or after other operations and in some embodiments inflight information may be lost without a failure event occurring, the inflight information may be resynced on the clustered system. In some embodiments, a failure event may occur without any inflight information being lost and dirty region information may be resynced on the clustered system.

Figure 3:
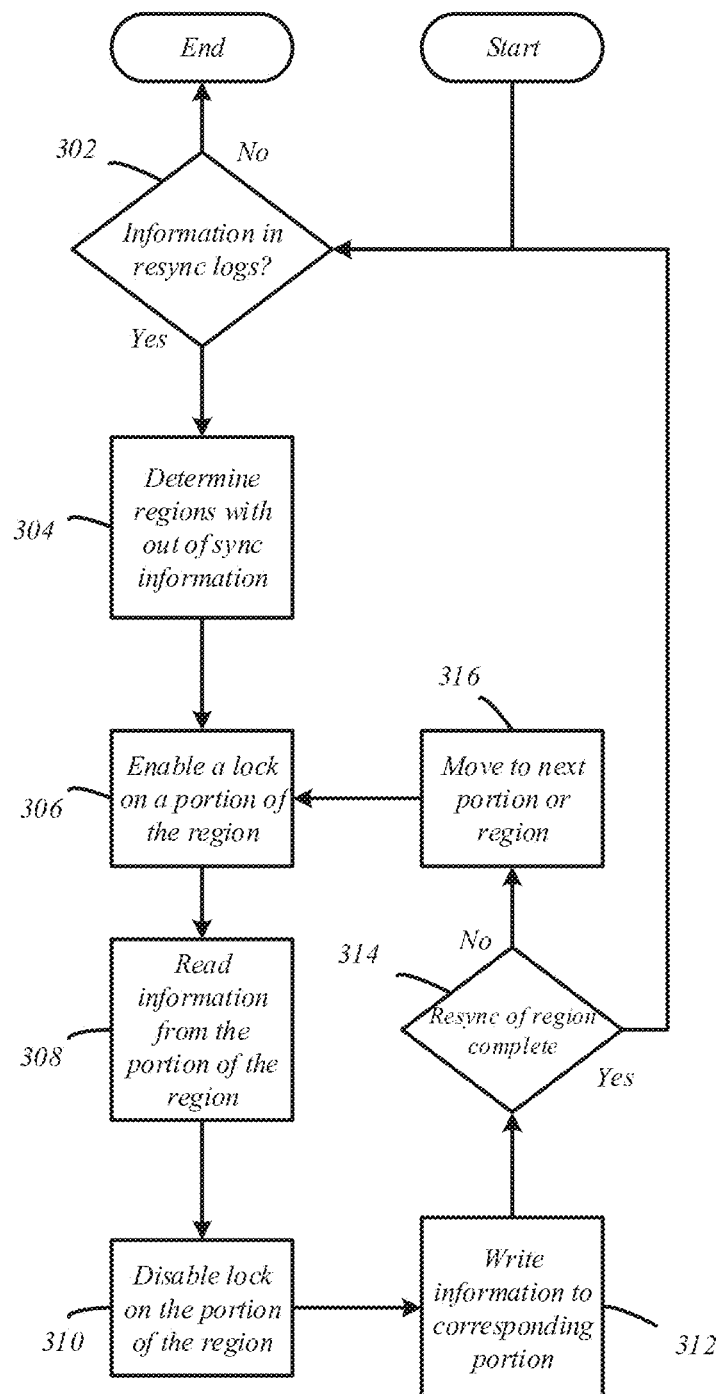
FIG. 3 illustrates a logic flow to schedule replication transfers.

FIG. 3 illustrates one exemplary embodiment of a logic flow 300 for performing a resynchronous operation based on dirty region log information and inflight tracker log information. Logic flow 300 may be representative of some or all of the operations executed by one or more embodiments described herein. Logic flow 300 is discussed with reference to the clustered system of FIGS. 1A-1D for illustrative purposes. However, various embodiments are not limited in the manner and the logic flow may be implemented on any computing system or device.

At decision block 302 a determination may be made as whether information, such as inflight tracker log information, is in the inflight tracker log 177 and dirty region information is in the dirty region log 179. For example, the resync engine 129 may read the inflight tracker log 177 to determine whether inflight tracker information needs to be resynced across the clustered system. The inflight tracker log information indicates which regions of the primary and/or second clusters that may have information not fully committed on both the primary cluster and secondary cluster. Logic flow 300 may also include determining whether dirty region log information is in the dirty region log 179 at block 302. The dirty region log 179 may include dirty region log information indicating regions that are out of sync on the clusters, i.e. where information is stored on the primary cluster or the secondary cluster, but not both.

At block 304, the inflight tracker log 177 may be used to determine one or more regions allocated for storage of information received from a client device, i.e. inflight information. Further, the dirty region log 179 may be used to determine one or more regions having dirty region information. For example, the resync engine 129 may read the inflight tracker log and the dirty region log 177 and determine which regions need to be resynced on the clusters.

The resync engine 129 may perform a resynchronous operation for each region indicated in the inflight tracker log 177 and the dirty region log 179. More specifically, the resync engine 129 may enable a lock on a portion of a region in which information will be read at block 306. The lock may be enabled to prevent information from being written to the portion of the region while the resynchronization is being performed. The resync engine 129 may read information from the portion of the region at block 308 and may disable the lock on the portion of the region at block 310. The resync engine 129 may write the information to a corresponding portion of a region on a corresponding cluster at block 312. For example, the resync engine 129 may read information from a portion of a region on the primary cluster and write information to a corresponding portion of a region on the secondary cluster, or vice versa.

In various embodiments, a determination as to whether a region has completely been resynced is made at decision block 314. If the region has been completely resynced, blocks 302 through 316 may be repeated for each region indicated in the inflight tracker log 177 and the dirty region log 179. However, if the region currently being resynced isn't complete, the resync engine 129 may move to the next portion of the region to copy information at block 316. The resync engine 129 may copy information from a region in a sweeping hand manner as previously discussed. Although FIG. 3 illustrates a number of blocks in a certain order, various embodiments are not limited in this manner.

Figure 4:
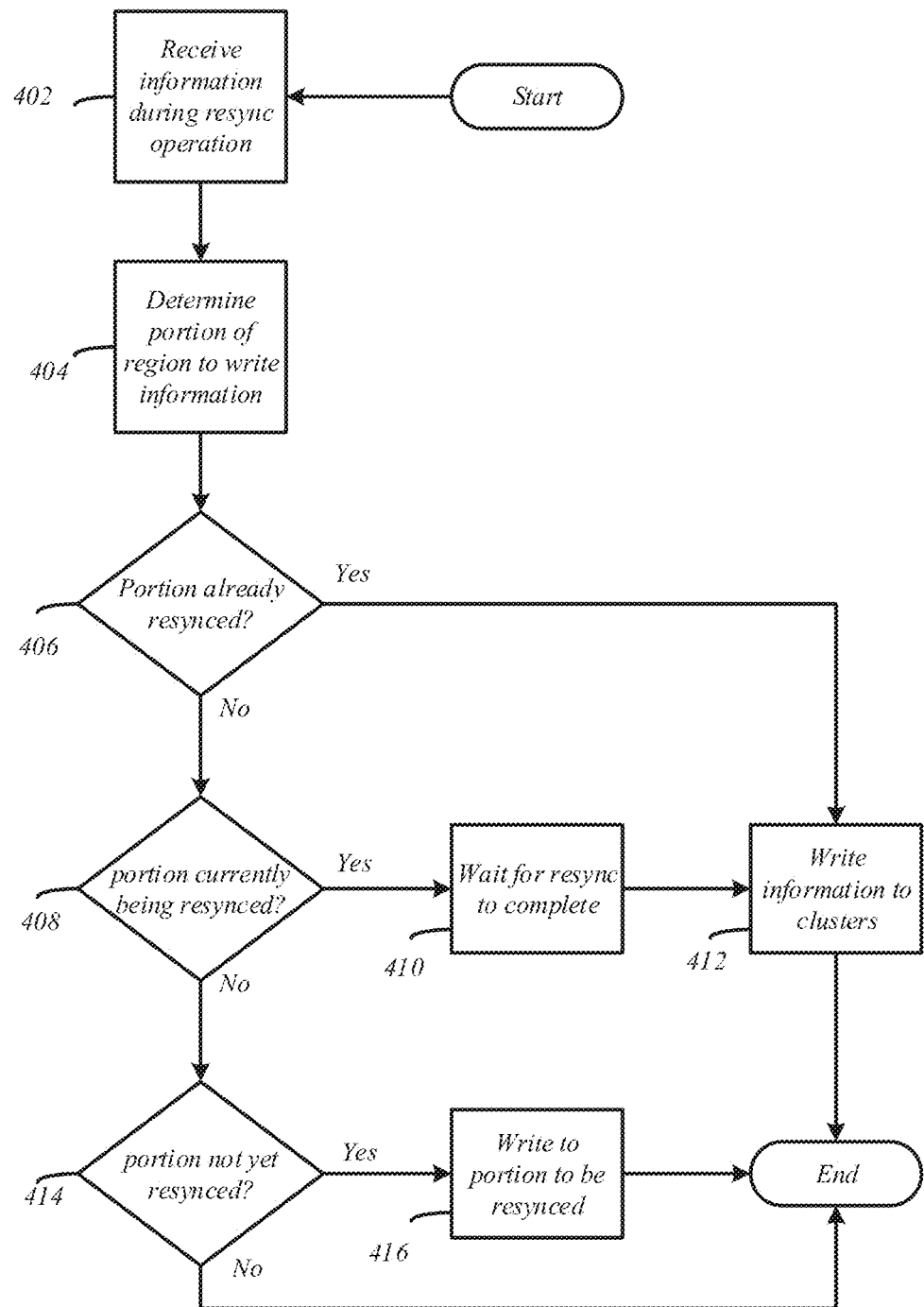
FIG. 4 illustrates a logic flow diagram to handle new information received during a resynchronous operation.

FIG. 4 illustrates an exemplary embodiment of a logic flow diagram 400 for handling new information received during a resynchronous operation. Logic flow 400 may be representative of some or all of the operations executed by one or more embodiments described herein. Logic flow 400 is discussed with reference to the clustered system of FIGS. 1A-1D for illustrative purposes. However, various embodiments are not limited in the manner and the logic flow may be implemented on any computing system or device.

At block 402, the clustered system may receive information to store on the clusters. If the clustered system is not performing a resynchronous operation, the information may be synchronously written to the primary cluster and secondary cluster by the splitter 127, as previously discussed. However, in some embodiments the clustered system may receive new information while a resynchronous operation is being performed. The resync engine 129 may handle the new information received during a resynchronous operation.

More specifically and in various embodiments, the resync engine 129 may determine where to write the new information at block 404. For example, the new information may include a write operation which may indicate a portion of a region to write the data to, such as one or more addresses, block numbers, or the like. The resync engine 129 may determine the status of that portion of the region including whether the portion has already been resynced, is currently being resynced or is to be resynced. For example, the resync engine 129 may determine if the portion of the region has already been resynced by the resynchronous operation at decision block 406. If so, the resync engine 129 may write or instruct the splitter 127 to synchronously write the information to the primary cluster and secondary cluster at block 412.

However, if the new information is to be written to a portion of a region that is currently being resynced as determined at decision block 408. The resync engine 129 may wait for the resynchronous operation to complete on that portion at block 410. In some embodiments, the resync engine 129 may enable a lock on the portion of the region currently being resynced to prevent corruption of data due to overwrite of data. Once the resynchronous operation has been completed on the portion to receive the new information, the resync engine 129 may synchronously write the new information to the clusters at block 412. In some embodiments, the resync engine 129 may instruct or permit the splitter 127 to synchronously write the new information to the clusters.

In some embodiments, the new information may be intended to be written to a portion of a region that is to be resynced at some future point in time, as determined at block 414. In this case, the resync engine 129 may write or instruct the splitter 127 to write the new information to the portion on the cluster that is to be read from during the resynchronous operation at block 416. For example, if the resynchronous operation is to copy information from the primary cluster to the secondary cluster, then the new information is to be written to the portion on primary cluster. Similarly, if the resynchronous operation is to copy information from the secondary cluster to the primary cluster, then the new information is to be written to the portion on the secondary cluster. By only writing the new information on one cluster, processing cycles and network bandwidth may be conserved. The new information will be synchronized on the clustered system when the resynchronous operation is performed on the portion that has the new information.

Figure 5A:
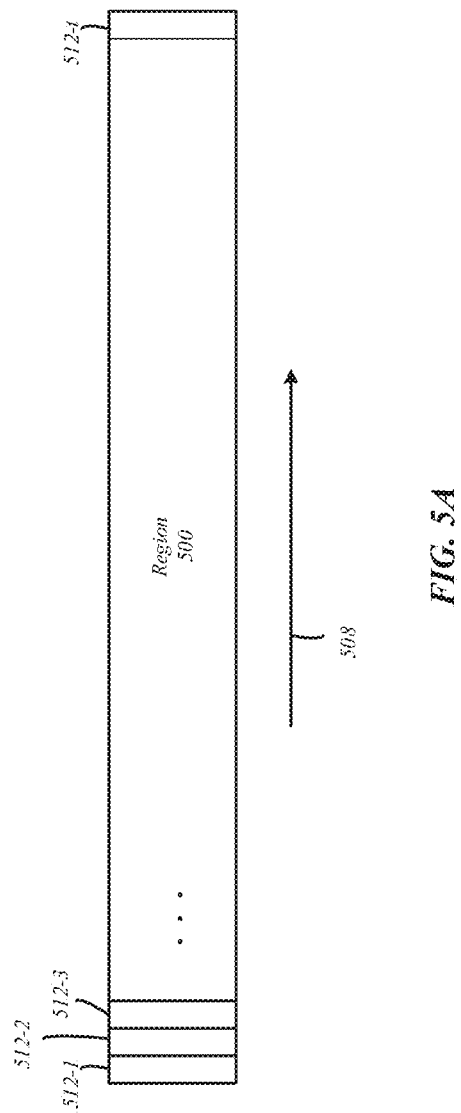
FIG. 5A illustrates an exemplary embodiment of a region.

FIGS. 5A-5D illustrate a region 500 during different stages of a resynchronous operation and handling new information received during a resynchronous operation. FIG. 5A illustrates a typical region during a resynchronous operation. As previously discussed, the clustered system may store information as logical units which may be divided into a number of smaller regions of a data structure, such as region 500, which may be further divided into one or more portions or blocks 512. Each region may have a particular region size, such as one Megabyte (MB) and each block may have a block size, such as four Kilobytes (KB), eight KB, 16 KB, 32 KB, 64 KB, and so forth. Thus, each region may have any number of blocks based on the region size and the block size. FIG. 5A illustrates region 500 having blocks 512-1 through 512-*t*, where t may be any positive integer value. In some embodiments, block 512-1 may have the lowest block number and block 512-*t* may have the highest block number.

During resynchronous operations, regions of a logical unit may be identified as out of sync in one or more logs, such as the inflight tracker log 177 and the dirty region log 179. Each of the regions identified may be resynced during the resynchronous operation. In some embodiments, the resync engine 129 may perform a resynchronous operation on a region utilizing a sweeping hand method and copying information starting with the lowest block number and finishing with the highest block number as illustrated by arrow 508. The resync engine 129 may read and write the information from the region 500 on a block-by-block basis or in groups of blocks.

Figure 5B:
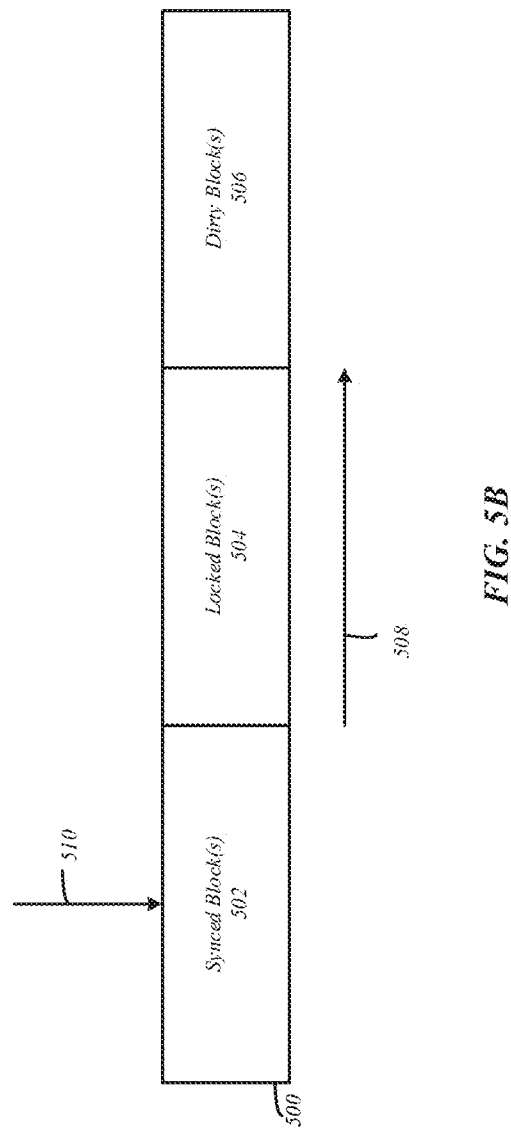
FIG. 5B illustrates a second exemplary embodiment of a region.

FIG. 5B illustrates region 500 during a resynchronous operation having one or more synced blocks 502, one or more locked blocks 504, and one or more dirty blocks 506. The one or more synced blocks 502 are blocks that have already been synced on the clusters during the resynchronous operation. Further, the one or more locked blocks 504 are blocks that are currently being resynced by the resynchronous operation and are locked from being written to by an outside operation. Finally, the one or more dirty blocks 506 are blocks that need to be resynced by the resynchronous operation.

Figure 5C:
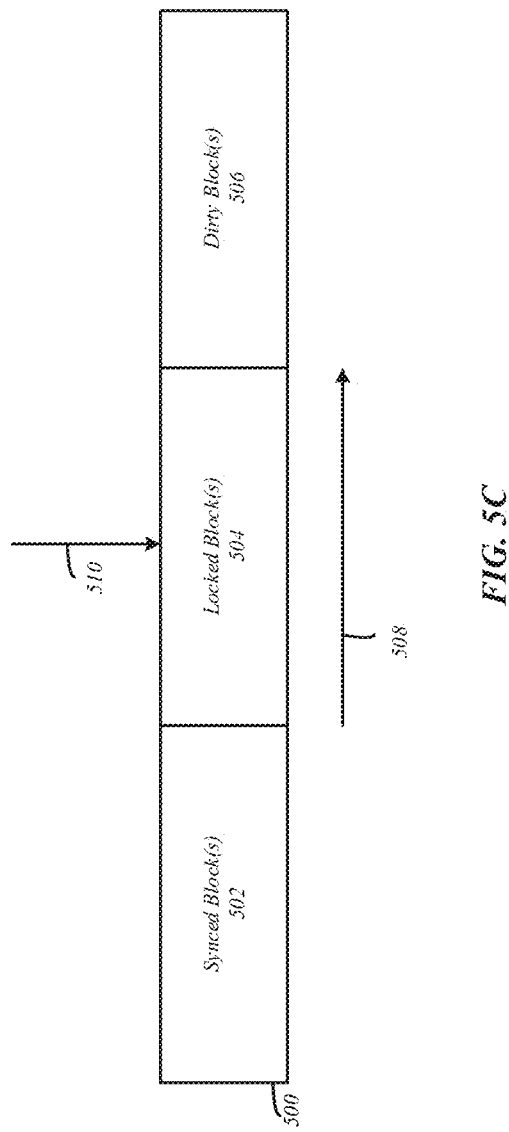
FIG. 5C illustrates a third exemplary embodiment of a region.

FIG. 5B illustrates the clustered system receiving new information intended to be written to region 500 as illustrated by arrow 510. In this exemplary embodiment, the new information is to be written to one or more blocks in the synced blocks 502 area of region 500. In this example, the resync engine 129 may synchronously write the new information on the primary cluster and secondary cluster since these blocks are in sync across the clustered system. FIG. 5C illustrates new information intended to be written to region 500 in the locked blocks 504 area as illustrated by arrow 510. In this exemplary embodiment, the resync engine 129 may wait until the resynchronous operation is complete on the blocks to be written. Then the resync engine 129 may synchronously write the new information on both the primary cluster and secondary cluster.

Figure 5D:
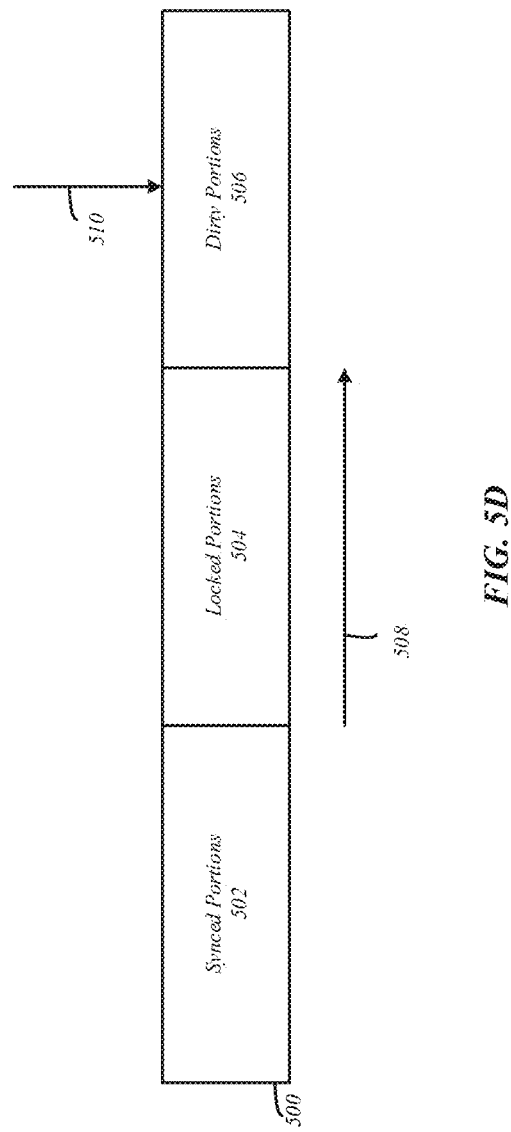
FIG. 5D illustrates a fourth exemplary embodiment of a region.

In another exemplary embodiment, FIG. 5D illustrates new information intended to be written to region 500 in the dirty blocks 506 area as illustrated by arrow 510. In this example, the resync engine 129 may write the new information to the region 500 prior to the resynchronous operation being performed on these blocks. Since these blocks still need to be resynced on the clusters, the resync engine 129 may only write the new information to the cluster being resynced from. For example, if the resync engine 129 is copying information from the primary cluster to the secondary cluster during the resynchronous operation, the new information may be written to the primary cluster. In another example, if the resync engine 129 is copying information from the secondary cluster to the primary cluster during the resynchronous operation, the new information may be written to the secondary cluster. The new information will be synced across the clusters when the resynchronous operation is performed on the dirty blocks 506 area. Various embodiments are not limited in this manner and the resync engine 129 may synchronously write the new information to both the primary and secondary cluster.

FIG. 6 illustrates an embodiment of logic flow 600. The logic flow 600 may be representative of some or all of the operations executed by one or more embodiments described herein. For example, the logic flow 600 may illustrate operations performed by systems of FIGS. 1A-1D. However, various embodiments are not limited in this manner.

In the illustrated embodiment shown in FIG. 6, the logic flow 600 may include receiving information from a client device to write on a clustered system comprising at least a first cluster and a second cluster at block 605. The clustered system may include the first cluster and second cluster to provide data integrity and system redundancy. For example, in some embodiments, the first cluster may be considered a primary cluster and the second cluster may be considered a secondary cluster. Information received by the clustered system may be synchronously written in a parallel manner to the both the primary cluster and secondary cluster to create data redundancy and a backup copy of the information.

In some embodiments, the information sent by the client device may include data and write operations to store data on the clustered system. The data may be any type of data including financial data, medical data, industry data, database data, product data, scientific data, experimental data, and so forth. In addition, the write operations may include one or more locations to store the data. For example, the write operations may include one or more block numbers of a logical unit indicating a location to store the data. The locations may be used to write the data on the clustered system, and in some instances, to track information in one or more logs.

At block 610, the logic flow 600 may include determining that a failure event has occurred on the clustered system creating unsynchronized information, the unsynchronized information comprising at least one of inflight information and dirty region information. As previously discussed, a failure event may be any type of event that may cause the clustered system to operate in a non-optimal manner, become out of sync, and may include a hardware failure, a software failure, and/or a networking failure. During the failure event the clustered system may continue to receive information from the client device. This information may be unsynchronized and may be handled by writing information to an inflight tracker log or a dirty region log.

In some embodiments, the logic flow 600 at block 615 may include performing a resynchronization operation to synchronize the unsynchronized information on the first cluster and the second cluster based on log information in at least one of an inflight tracker log and a dirty region log. For example, the inflight tracker log may include log inflight information or information that has not been fully committed on the clustered due to the failure event or for some other reason. During the resynchronous operation, the inflight tracker log may be read, and the information stored on the primary cluster may be copied to the secondary cluster regardless as to whether the information is the newly received information from a client device, for example. In some embodiments, the dirty region log may log dirty region information or information that has been written to one of the clusters, the first or the second cluster, but not both of the clusters. Therefore, the dirty region information may need to be copied from one cluster to another cluster after the failure event has been resolved. A resynchronization operation may be performed to copy information from the primary cluster to the secondary cluster based on the inflight tracker log and the dirty region log.

Figure 7:
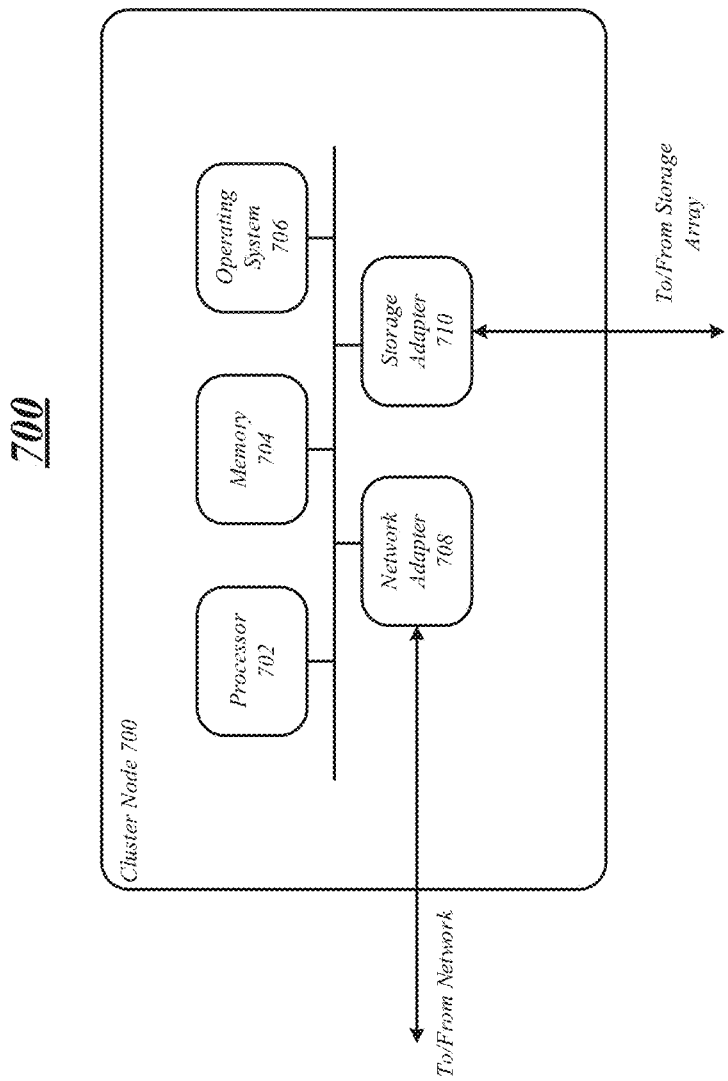
FIG. 7 illustrates an exemplary embodiment of a computing system.

FIG. 7 illustrates an exemplary embodiment of hardware architecture of a cluster node 700. In some embodiments, cluster node 700 may be the same or similar as one of the cluster nodes 108 included in the storage system 100. Cluster node 700 may include processor 702, memory 704, storage operating system 706, network adapter 708 and storage adapter 710. In various embodiments, the components of cluster node 700 may communicate with each other via one or more interconnects, such as one or more traces, buses and/or control lines.

Processor 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, cluster node 700 may include more than one processor.

In one embodiment, cluster node 700 may include a memory unit 704 to couple to processor 702. Memory unit 704 may be coupled to processor 702 via an interconnect, or by a dedicated communications bus between processor 702 and memory unit 704, which may vary as desired for a given implementation. Memory unit 704 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory unit 704 may store data momentarily, temporarily, or permanently. The memory unit 704 may store instructions and data for cluster node 700. The memory unit 704 may also store temporary variables or other intermediate information while the processor 702 is executing instructions. The memory unit 704 is not limited to storing the above discussed data; the memory unit 704 may store any type of data. In various embodiments, memory 704 may store or include storage operating system 706

In various embodiments, cluster node 700 may include storage operating system 706 to control storage operations on the cluster node 700. In some embodiments, storage operating system 706 may be stored in memory 704 or any other type of storage device, unit, medium, and so forth. The storage operating system 706 may implement a write-anywhere file system that cooperates with virtualization modules to "virtualize" the storage space provided on the storage arrays and storage devices. The file system may logically organize the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 708 may include the mechanical, electrical and signaling circuitry needed to connect the cluster node 700 to one or more hosts and other storage systems over a network, which may include a point-to-point connection or a shared medium, such as a local area network.

In various embodiments, the storage adapter 710 cooperates with the operating system 706 executing on the cluster node 700 to access information requested by a host device, guest device, another storage system and so forth. The information may be stored on any type of attached array of writable storage device media such as video tape, optical, DVD, magnetic tape, bubble memory, electronic random access memory, micro-electro mechanical and any other similar media adapted to store information, including data and parity information. Further, the storage adapter 710 includes input/output (I/O) interface circuitry that couples to the disks over an I/O interconnect arrangement, such as a conventional high-performance, FC serial link topology.

Figure 8:
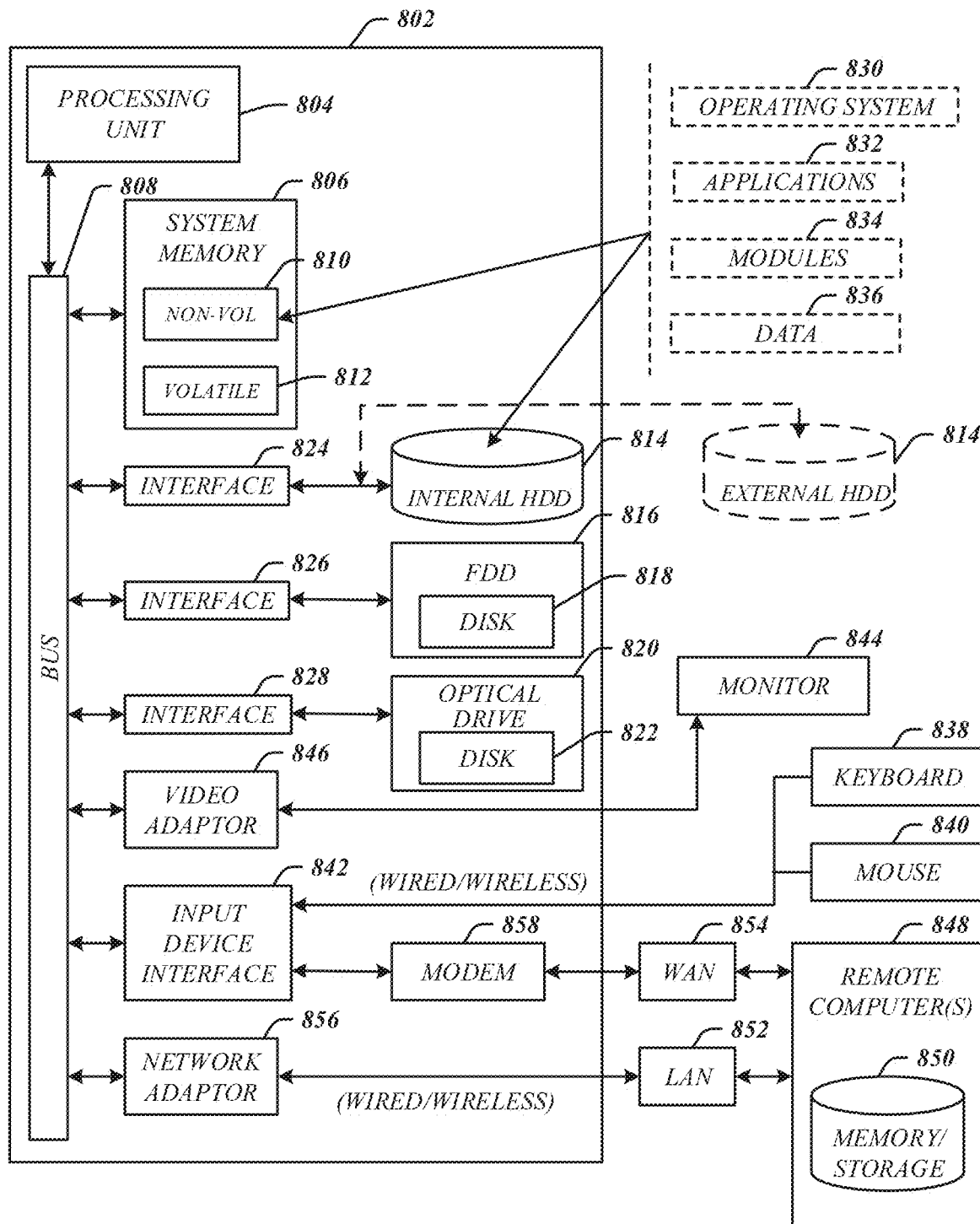
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may include or be implemented as part of computing system, such as storage systems 100, 125, 150 and 175.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the storage system 100, 125, 150, and 175 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system, comprising:
   a memory having stored thereon instructions; and
   a processor unit coupled with the memory, the processor unit configured to execute the instructions to cause the processor unit to execute:
      a sync transfer engine that transfers information copies from a first node to a second node;
      a splitter that synchronously sends information to a first storage device of the first node and utilizes the sync transfer engine to send a copy of the information to a second storage device of the second node; and
      a resync engine that tracks log information regarding operation of the splitter, wherein the resync engine utilizes the log information to resynchronize the first node and the second node.

2. The system of claim 1, wherein the resync engine comprises:
   a resync control that resyncs a set of information from a first data structure at the first node to a second data structure at the second node.

3. The system of claim 1, wherein the resync engine comprises:
   a resync control that synchronizes lost inflight information tracked by the resync engine using an inflight log.

4. The system of claim 1, wherein the resync engine comprises:
   a resync control that logs dirty region information using a dirty region log.

5. The system of claim 1, wherein the resync engine comprises:
   a resync control that verifies that the first node and the second node are in sync.

6. The system of claim 1, wherein the resync engine comprises:
   a resync control that evaluates the log information to identify inflight information and dirty region information to resync across the first node and the second node.

7. The system of claim 1, wherein the resync engine comprises:
   a resync control that utilizes a resync scanner to perform a reverse resynchronization operation to copy information from a second data structure associated with the second node to a first data structure associated with the first node.

8. The system of claim 1, wherein the resync engine comprises:
   a resync control that utilizes a sweeping hand operation to perform the resynchronization by copying information from one end point of a region to a different endpoint of the region.

9. The system of claim 1, wherein the resync engine comprises:
   a resync control that starts a resynchronization operation at an endpoint having a lowest block number and copies information on a block-by-block basis using a resync scanner until a different endpoint having a highest block number is reached.

10. The system of claim 1, wherein the resync engine comprises:
    a resync control that starts a resynchronization operation at an endpoint having a highest block number and copies information on a block-by-block basis using a resync scanner until a different endpoint having a lowest block number is reached.

11. The system of claim 1, wherein the resync engine comprises:
    a resync control that initializes a resynchronization operation to resynchronize the first node and the second node.

12. A method, comprising:
    receiving information to write to first storage of a first node;
    logging the information into an inflight tracker log;
    synchronously executing a write operation to write the information to the first storage of the first node and to second storage of a second node; and
    in response to the write operation succeeding, clearing the information from the inflight tracker log.

13. The method of claim 12, comprising:
    determining that the write operation was not successful;
    determining whether a failure event occurred; and
    in response to the failure event not occurring, performing a resync operation to resync the first node and the second node.

14. The method of claim 12, comprising:
    determining that the write operation was not successful;
    determining whether a failure event occurred;
    in response to the failure event occurring, tracking information during the failure event until the failure event has been resolved based upon the tracking information; and
    in response to resolving the failure event, performing a resync operation to resync the first node and the second node.

15. A computer-readable storage medium comprising instructions that, when executed by processing circuitry, enable the processing circuitry to:
    in response to initiating a resync operation to resync a first node and a second node, evaluate resync logs to identify information to resync;
    identify regions of a first storage of the first node that comprise out of sync information with respect to second storage of the second node;
    enable a lock on a portion of the regions;
    read information from the portion of the regions while the lock is enabled; and
    write the information to a corresponding portion of the second storage.

16. The computer-readable storage medium of claim 15, wherein the instructions enable the processing circuitry to:
    in response to reading the information, disable the lock on the portion of the regions.

17. The computer-readable storage medium of claim 15, wherein the instructions enable the processing circuitry to:
    disable the lock on the portion of the regions before writing the information to the corresponding portion of the second storage.

18. The computer-readable storage medium of claim 15, wherein the instructions enable the processing circuitry to:
    receive information during the resync operation;
    identify a target portion of the regions where the information is to be written;
    in response to the target portion already being resynced, write the information to the first node and the second node.

19. The computer-readable storage medium of claim 15, wherein the instructions enable the processing circuitry to:
    receive information during the resync operation;
    identify a target portion of the regions where the information is to be written;

in response to the target portion being currently resynced, write the information to the first node and the second node after waiting for the target portion to finish being resynced.

20. The computer-readable storage medium of claim 15, wherein the instructions enable the processing circuitry to:
receive information during the resync operation;
identify a target portion of the regions where the information is to be written;
in response to determining that the target portion has not yet been resynced, write the information to the target portion.

21. A method, comprising:
transferring, by a sync transfer engine, information copies from a first node to a second node;
synchronously sending, by a splitter, information to a first storage device of the first node and utilizes the sync transfer engine to send a copy of the information to a second storage device of the second node; and
tracking, by a resync engine, log information regarding operation of the splitter, wherein the resync engine utilizes the log information to resynchronize the first node and the second node.

22. The method of claim 21, comprising:
utilizing, by a resync control, a sweeping hand operation to perform the resynchronization by copying information from one end point of a region to a different endpoint of the region.

23. The method of claim 21, comprising:
utilizing, by a resync control, a resync scanner to perform a reverse resynchronization operation to copy information from a second data structure associated with the second node to a first data structure associated with the first node.

24. A computer-readable storage medium comprising instructions that, when executed by processing circuitry, enable the processing circuitry to:
receive information to write to first storage of a first node;
log the information into an inflight tracker log;
synchronously execute a write operation to write the information to the first storage of the first node and to second storage of a second node; and
in response to the write operation succeeding, clear the information from the inflight tracker log.

25. The computer-readable storage medium of claim 24, wherein the instructions enable the processing circuitry to:
determine that the write operation was not successful;
determine whether a failure event occurred;
in response to the failure event occurring, track information during the failure event until the failure event has been resolved based upon the tracking information; and
in response to resolving the failure event, perform a resync operation to resync the first node and the second node.

26. The computer-readable storage medium of claim 24, wherein the instructions enable the processing circuitry to:
determine that the write operation was not successful;
determine whether a failure event occurred; and
in response to the failure event not occurring, perform a resync operation to resync the first node and the second node.

27. A system, comprising:
a memory having stored thereon instructions; and
a processor unit coupled with the memory, the processor unit configured to execute the instructions to cause the processor unit to:
in response to initiating a resync operation to resync a first node and a second node, evaluate resync logs to identify information to resync;
identify regions of a first storage of the first node that comprise out of sync information with respect to second storage of the second node;
enable a lock on a portion of the regions;
read information from the portion of the regions while the lock is enabled; and
write the information to a corresponding portion of the second storage.

28. The system of claim 27, wherein the instructions cause the processor unit to:
receive information during the resync operation;
identify a target portion of the regions where the information is to be written;
in response to the target portion already being resynced, write the information to the first node and the second node.

29. The system of claim 27, wherein the instructions cause the processor unit to:
receive information during the resync operation;
identify a target portion of the regions where the information is to be written;
in response to the target portion being currently resynced, write the information to the first node and the second node after waiting for the target portion to finish being resynced.

* * * * *